United States Patent
Krylov et al.

(10) Patent No.: US 8,479,574 B2
(45) Date of Patent: Jul. 9, 2013

(54) MICRO SCALE MECHANICAL RATE SENSORS

(75) Inventors: Viacheslav Krylov, Holon (IL); David Schreiber, Tel-Aviv (IL); Yosi Shacham-Diamand, Zichron-Ya'acov (IL)

(73) Assignee: Ramot at Tel-Aviv University Ltd., Tel Aviv (IL)

( * ) Notice: Subject to any disclaimer, the term of this patent is extended or adjusted under 35 U.S.C. 154(b) by 175 days.

(21) Appl. No.: 12/871,912

(22) Filed: Aug. 31, 2010

(65) Prior Publication Data

US 2011/0048130 A1    Mar. 3, 2011

Related U.S. Application Data

(63) Continuation of application No. PCT/IL2009/000243, filed on Mar. 3, 2009.

(60) Provisional application No. 61/033,182, filed on Mar. 3, 2008.

(51) Int. Cl.
   *G01C 19/56*    (2012.01)
(52) U.S. Cl.
   USPC .................................. 73/504.12; 73/504.13
(58) Field of Classification Search
   USPC ............... 73/504.13, 504.12, 504.04, 504.02, 73/504.14, 504.15, 504.11, 504.08
   See application file for complete search history.

(56) References Cited

U.S. PATENT DOCUMENTS

| | | | | |
|---|---|---|---|---|
| 2,605,093 | A | * | 7/1952 | Dorand ...................... 73/504.11 |
| 2,683,247 | A | * | 7/1954 | Wiley ............................ 318/648 |
| 4,326,428 | A | * | 4/1982 | Bostwick et al. ................ 74/5 F |
| 4,644,793 | A | | 2/1987 | Church |
| 4,655,081 | A | * | 4/1987 | Burdess ...................... 73/504.13 |
| 5,353,656 | A | | 10/1994 | Hawkey et al. |
| 5,783,749 | A | * | 7/1998 | Lee et al. ................... 73/504.12 |
| 5,894,090 | A | | 4/1999 | Tang et al. |
| 5,992,233 | A | | 11/1999 | Clark |
| 6,205,856 | B1 | | 3/2001 | Okada |
| 6,269,697 | B1 | | 8/2001 | Okada |
| 6,474,161 | B1 | * | 11/2002 | Jeanroy et al. ............. 73/504.13 |

(Continued)

FOREIGN PATENT DOCUMENTS

GB    2276976 A    10/1994

OTHER PUBLICATIONS

International Preliminary Report on Patentability, issued Sep. 7, 2010 from International Application No. PCT/IL2009/000243.

(Continued)

*Primary Examiner* — Helen Kwok
(74) *Attorney, Agent, or Firm* — Browdy and Neimark, PLLC

(57) ABSTRACT

An angular rate sensor device is presented. The sensor device comprises a disk-shaped structure having a proof mass region and a flexible portion. The disk-like structure is coupled to a substrate in a manner enabling a wave type precession motion such that during the wave type precession motion each material point of the proof mass performs elliptic motion.

10 Claims, 6 Drawing Sheets

U.S. PATENT DOCUMENTS

| | | | |
|---|---|---|---|
| 6,595,054 B2 | 7/2003 | Paros et al. | |
| 6,670,212 B2 | 12/2003 | Mc.Nie et al. | |
| 6,686,807 B1 * | 2/2004 | Giousouf et al. | 331/154 |
| 6,792,792 B2 | 9/2004 | Babala | |
| 6,928,873 B2 | 8/2005 | Chen et al. | |
| 6,959,600 B2 * | 11/2005 | Lonsdale et al. | 73/504.13 |
| 7,134,171 B2 * | 11/2006 | Hodgins | 29/25.35 |
| 7,526,957 B2 * | 5/2009 | Watson | 73/504.13 |
| 7,793,541 B2 * | 9/2010 | Challoner | 73/504.13 |
| 8,042,393 B2 * | 10/2011 | Gier et al. | 73/504.02 |
| 2004/0055381 A1 | 3/2004 | Shcheglov et al. | |
| 2010/0058863 A1 * | 3/2010 | Classen | 73/504.12 |

OTHER PUBLICATIONS

F. Ayazi et al., "A HARPASS Polysilicon Vibrating Ring Gyroscope", Journal of Microelectromechanical Systems, vol. 10, No. 2, Jun. 2001.

C. Shearwoo et al., "Development of a levitated micromotor for application as a gyroscope", Sensors and Actuators, 83, (2000) pp. 85-92.

International Search Report, mailed Sep. 3, 2009, from International Application No. PCT/IL2009/000243, filed Mar. 3, 2009.

* cited by examiner

MODE 1.F25.36    MODE MAG 263.7
TIME 0.000

MODE 1.F25.36    MODE MAG 263.7
TIME 0.000

MICRO SCALE MECHANICAL RATE SENSORS

RELATED APPLICATIONS

This application is a Continuation of PCT application serial number PCT/IL2009/000243 filed on Mar. 3, 2009 which claims priority to U.S. Provisional application Ser. No. 61/033,182 filed on Mar. 3, 2008 both of which are incorporated herein by reference in their entirety.

FIELD OF THE INVENTION

This invention is in the field of mechanical rate sensors (gyroscopes) and relates to a micro scale angular rate sensor, particularly a sensor that can be fabricated by micromachining methods.

BACKGROUND OF THE INVENTION

Angular rate sensors are designed for measuring rotational velocity around the sensitive axis of the sensor. Such a device is typically composed of a rapidly spinning wheel or disk mounted on a shaft with various kinds of supports to allow it to spin freely. Its angular momentum resists the angular motion of its base about the two axes orthogonal to its spin axis. Angular rate sensors are used in conjunction with accelerometers to make a dynamic measurement of an orientation angle; or used by themselves to track rotational motion or a rate of acceleration of a moving object, with which the sensor is associated, by sensing an effect of this movement onto an internal proof mass. Typically, such an inertial proof mass is suspended from the sensor housing or body which is rigidly mounted to the object.

Most of micro scale mechanical rate sensors, although varying in type and design, operate on similar principles: the sensor structure, when driven in a specific direction and subjected to an angular acceleration about the sensor's input axis, deflects in the direction orthogonal to the input axis due to presence of the Coriolis force. This deflection can be sensed electrostatically, magnetically, optically or using piezoresistive or piezoelectric elements. Since the Coriolis force is small due to small mass of micro scale devices, the dynamic amplification is used and the devices are typically driven at resonance. In order to exploit the dynamic amplification, resonant frequencies of the driving and sensing mode should be perfectly matched. Some examples of the devices of the kind specified are disclosed in the following patent publications: U.S. Pat. No. 5,992,233; U.S. Pat. No. 6,928,873; U.S. Pat. No. 6,792,792; U.S. Pat. No. 6,595,054. The main difficulty in this kind of devices is related to the fact that the frequencies cannot be perfectly matched due to low relative tolerances of microfabrication.

Another mechanical rate sensor is a shell gyro (e.g. U.S. Pat. No. 4,644,793). A shell gyro utilizes a mechanical scheme with degenerated, automatically matched modes. However, a shell gyro is difficult to fabricate using micromachining methods. This kind of structure implemented at micro scale is ring gyro is described for example in GB 2 276 976; U.S. Pat. No. 6,670,212; and F. Ayazi and K. Najafi, "A HARPSS Polysilicon Vibrating Ring Gyroscope", JOURNAL OF MICROELECTROMECHANICAL SYSTEMS, VOL. 10, NO. 2, JUNE 2001.

The ring gyro vibrates in a radial direction in such a way that the shape of its vibrational mode is elliptical. When an angular rate is present in the direction perpendicular to the ring plane, the direction of the largest semi axis of the ellipse changes proportionally to the angular rate. Since the ring stiffness is identical in any direction, the frequencies matching is not necessary. However, the performance, and mainly resolution of the ring gyro, is limited by a small mass of the ring and necessity to detect very small deflections. In addition, the symmetry of the ring stiffness is typically not ideal due to suspension springs attached to it. An alternative is a magnetically or electrostatically levitated spinning disk gyro, described for example in U.S. Pat. No. 5,353,656; and C. Shearwood, K. Y. Ho, C. B. Williams, H. Gong, "Development of a levitated micromotor for application as a gyroscope, Sensors and Actuators", 83, 2000 pp. 85-92. The spinning disks gyros potentially could demonstrate superior performance due to larger proof mass. However, the control of the disk motion is usually very complex due to an intrinsic instability of a spinning disk while the fabrication is usually challenging or requires assembly steps. In addition, in the case of magnetic levitation, levitation and control coils exhibit relatively high power consumption.

Yet another known design of an angular rate sensor is a clover leaf gyroscope. This is described for example in U.S. Pat. No. 5,894,090. Such a device also presents a vibrational type sensor.

GENERAL DESCRIPTION

There is a need in the art for a novel angular rate sensor, capable of being used in various applications, such as inertial navigation and electronics market (camera stabilization, automotive, toys, robotics), which provides for measurements with high accuracy and which can be manufactured by micromachining.

The present invention provides a novel angular sensor device which combines the use of a disk-shaped proof mass and the use of a wave type motion. Also, the invention can use a shell type flexible structure with intrinsically matched frequencies.

The device of the present invention has a disk-like plate. The disk-like plate is attached to a substrate (e.g. in its central point) in a manner to define a proof mass region within the disk, and is configured to perform a wave type precession motion. In some embodiments of the invention, the disk is coupled to the axis of rotation by its central part or peripheral ring part, and defines the proof mass region of the disk located at, respectively, the peripheral ring part or the central part of the disk. The configuration is such that an annular region of the disk, between its central and periphery parts, is deformable along a circumference thereof and also along axes perpendicular to the axis of the device rotation. This can be implemented by making this annular region appropriately flexible. Alternatively, the central post supporting the disk at its central point could have certain mechanical compliance allowing the precession wave type motion of the disk.

It should be understood that the flexible annular region of the disk relative to the proof mass region of the disk is created as a region of an appropriate thickness allowing the above type of deformation while the proof mass has a certain moment of inertia with respect to axes lying within the plane of the disk. This may be achieved by making the periphery and/or central free parts of the disk thicker than the annular region, or, in case of the uniform thickness of the free part of the disk, by providing an appropriate ratio between the thickness and the width of the disk for a given width of the coupled central part. In the latter case, a border between the relatively flexible annular region and the periphery-ring proof mass region is qualitative and is determined by different moments of inertia caused by a difference in the distances between the respective regions of the disk and the central part.

The above configurations are achievable by micro-machining, for example applied to a silicon-on-insulator (SOI) wafer.

The sensor device of the present invention thus presents is an angular rate sensor comprising a disk-shaped flexible structure attached to a substrate at the central point (i.e. a point located on the axis of symmetry of an axisymmetric structure) and configured to perform a wave type precession motion. In the framework of this motion, each material point of the structure performs elliptic motion in the plane perpendicular to the plane of the angular rate vector.

The disk-like structure is rotatable around an axis parallel to the disk, and has an annular relatively flexible region and a relatively rigid proof mass region, located either at the center of the disk or at its ring periphery, such that the excitation for precession of the rotating disk causes a detectable change of precession phase. This change is indicative of the rate of the disk rotation. The change in the precession phase is caused by deformation of the annular region along a circumference thereof, where the deformation is caused by Coriolis forces (moments) induced by the device rotation and the excited precession of the disk. These moments are created by the excited precession of the disk owing to the flexing of the annular region along axes perpendicular to the axis of the device rotation.

Due to the flexibility of the annular region of the disk, the proof mass region can perform a tilting motion with respect to the coupled region. Since the annular region has circular symmetry, its bending stiffness is identical in any direction. When excited dynamically, the disk performs tilting or, in the case of small imperfection and mismatch between the two tilting frequencies, precessing, wave type, out of plane motion. In the presence of angular rate around an axis parallel to the disk plane, the Coriolis force acts in the direction perpendicular to the direction of motion and precession angle is changed. The angular rate is extracted from the measurement of the angle of precession.

Thus, in some embodiments of the invention, the disk is formed with two regions of different thicknesses, the thinner region presenting the flexible deformable region and the thicker region presenting the proof mass. In some examples, this thicker proof mass region may be a peripheral ring-like region surrounding the annular thin region, while the central part of the disk is a stand attached to a substrate and coupled to the axis of the disk rotation. In some other examples, the thicker proof mass region is constituted by a central region of the disk surrounded by the annular thin region, while the periphery ring surrounding the annular thin region is coupled to the axis of the device rotation. In another embodiment of the invention, the disk by its central part is coupled to the axis of the disk rotation, and the other part is made thin so as to define the annular relatively flexible region surrounding the central part and a periphery relatively rigid region presenting the proof mass.

As indicated above, the device of the present invention can be fabrication by using an SOI wafer and deep reactive ion etching (DRIE). The entire device is fabricated from the wafer, e.g. the flexible annular part of the device is a layer of the wafer, and the central stand (coupled to the axis of rotation) and the periphery ring part of the disk (the proof mass) are made from the handle of the wafer.

It should be understood that the device does not contain any flexible elements of critical dimensions. Its natural frequencies are related to a thickness of the layer of the SOI wafer, which can be fabricated with very high precision.

In the device of the present invention, the eigenfrequencies are matched automatically, and a small dimension of the shell is constituted by a thickness of an annular region (e.g. formed by an SOI device layer). The SOI wafers can be purchased with very high level of precision in the thickness of the device layer. As a result, the uncertainty in the flexible element stiffness is reduced dramatically. On the other hand, since the all thickness of the handle is used as a proof mass, the effective mass of the sensor is increased thereby improving significantly the sensitivity and reducing influence of the thermal noise. In the case of the small mismatch between the two tilting frequencies, the functionality of the device is preserved since the mismatch results in an elliptical precessions rather than a circular precession.

The motion of the proof mass is out of plane. This simplifies significantly the sensing and actuation. For example, in the case of electrostatic actuation and sensing, large area electrodes can be located under the proof mass, the gap between the electrodes and the proof mass is defined by the thickness of thin films and can be provided as small as necessary. In the case of magnetic actuation and sensing, large magnetic mass of the proof mass simplifies both actuation and sensing. The fact that the flexible annular plate is used as a spring element, provides for high resonant frequency and high mass velocity, which is beneficial for inertial measurement. Additional benefit from the plate type of the flexible element is the fact that the device is less prone to damages related to shock and environmental vibrations.

The device of the present invention is attached to the substrate by the central stand or by the periphery ring, and, as a result, does not exhibit wobble type motion, is intrinsically stable and does not require a closed loop control for stabilization.

Finally, the device is excited in a sense in a wave type precession motion. The precession can be measured with very high accuracy since small Coriolis forces result in relatively large change in the precession.

Thus, according to one broad aspect of the invention, there id provided an angular rate sensor comprising a disk-shaped structure having a proof mass region and a flexible portion (spring portion), the disk-like structure being coupled to a substrate in a manner enabling a wave type precession motion of said flexible portion such that during said wave type precession motion each material point of the proof mass performs elliptic motion.

The disk-shaped structure may have the following configuration: include a first region for coupling to an axis of device rotation which is substantially parallel to the disk plane, a second annular region comprising said relatively flexible region, and a third region being relatively rigid and presenting the proof mass region. Excitation for precession of the rotating disk-shaped structure causes a detectable change of a precession phase indicative of the rate of the structure rotation.

The relatively flexible annular region may be configured to be deformable along a circumference thereof and for flexing along axes perpendicular to the axis of rotation.

The flexible annular region may be a region of an appropriate thickness allowing the deformation and having a certain moment of inertia with respect to an axis of symmetry of the disk-shaped structure. The third proof mass region is much thicker than the annular region.

In some configurations, the first region for coupling to the axis of rotation is the central region of the disk-shaped structure, and the third proof mass region is the peripheral ring region surrounding the annular region. In some other embodiments, the first region for coupling to the axis of rotation is the peripheral ring region surrounding the annular region, and the third proof mass region is the central region of the disk-shaped structure.

In further embodiments, the first region for coupling to the axis of rotation is the central region of the disk-shaped structure surrounded by the second annular region, and the third proof mass region is the peripheral ring region surrounding said annular region.

In yet other embodiments, the disk-like structure is attached to the substrate by a flexible stand having a bending and torsion compliances.

According to another broad aspect of the invention, there is provided a method of manufacturing an angular rate sensor device, the method comprising patterning a disk-like structure to define a first region configured for coupling the structure to an axis of rotation, a second relatively thin annular region, and a third relatively thick, proof mass region, thereby enabling excitation for precession of the disk-shaped structure, while rotating along said axis parallel to the disk plane, to cause deformation of said relatively thin annular region along a circumference thereof and flexing of said relatively thin annular region along axes perpendicular to the axis of rotation, resulting in a detectable change of a precession phase indicative of the rate of the structure rotation.

BRIEF DESCRIPTION OF THE DRAWINGS

In order to understand the invention and to see how it may be carried out in practice, embodiments will now be described, by way of non-limiting example only, with reference to the accompanying drawings, in which.

DESCRIPTION OF EMBODIMENTS

Figure 1:
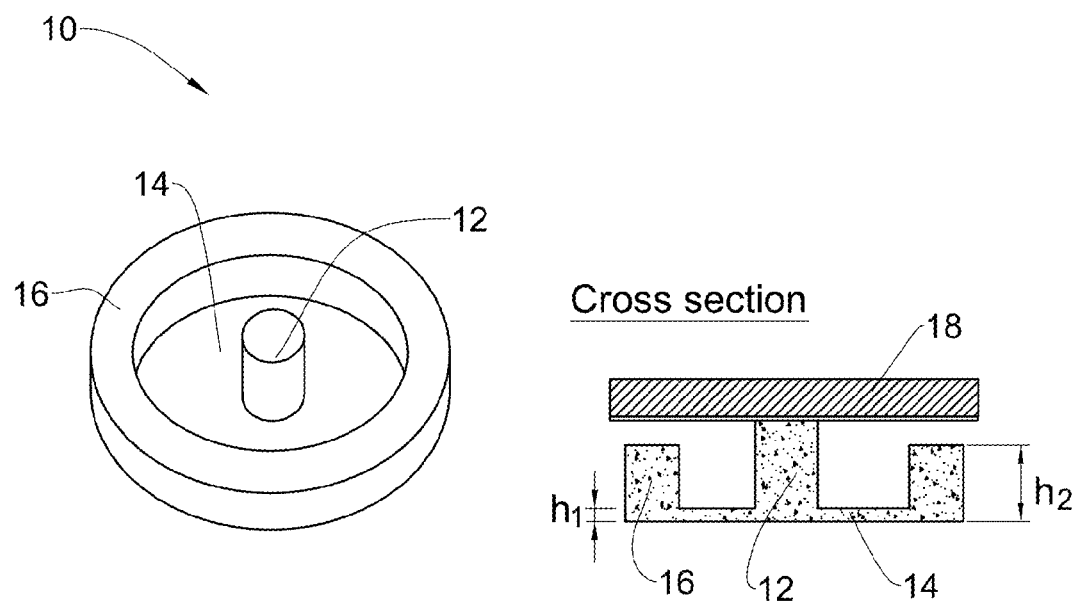
FIG. 1 illustrates an example of a sensor device according to the invention.

Referring to FIG. 1, there is illustrated an example of an angular rate sensor, generally designated 10, according to the invention. The sensor device 10 is designed like a disk and has a flexible portion 14 which is coupled to a substrate 18 in a manner enabling a wave type precession motion of this portion 14, such that during this motion each material point of the portion 14 performs elliptic motion. More specifically, the device 10 has a central region (stand) 12, annular region (plate) 14 of a first small thickness $h_1$ surrounding the central region 12, and a periphery ring-like region 16 of a second much larger thickness $h_2$ surrounding the annular plate 14. The annular plate 14 thus presents a relatively flexible element or portion of device 10, while the outer ring-like member 16 presents a rigid element or portion. In this example, the above coupling between the flexible portion 14 and the substrate is achieved by attaching the central stand 12 to the substrate 18 and coupling it to an axis of the device rotation which is parallel to the disk plane. In this example, the outer ring-like member 16 serves as a proof mass.

Figure 2:
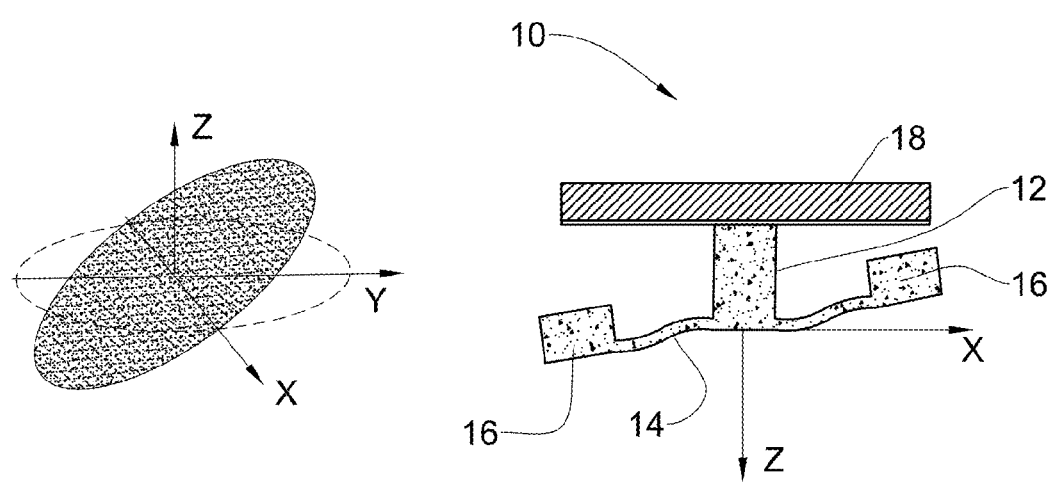
FIG. 2 illustrates a tilting motion of the device of FIG. 1.

Reference is made to FIG. 2 illustrating a tilting motion of the device 10. Due to the flexibility of the annular part 14 of the disk 10, the outer part 16 can perform a tilting motion with respect to the stand 12. Since the annular plate 14 is circular, its bending stiffness is identical in any direction. When excited dynamically, the disk 10 performs tilting or, in the case of small imperfections, precessing, wave type, out of plane motion.

Figure 3A:
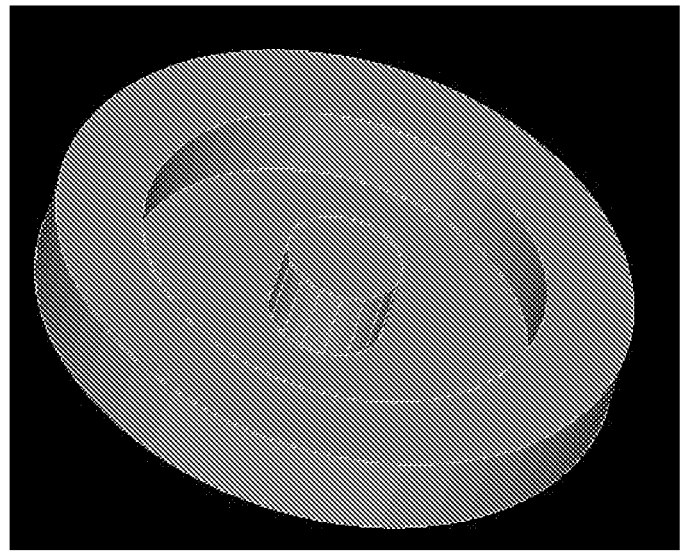
FIG. 3A shows the geometry of a sensor device configured according to the invention.
Figure 3B:
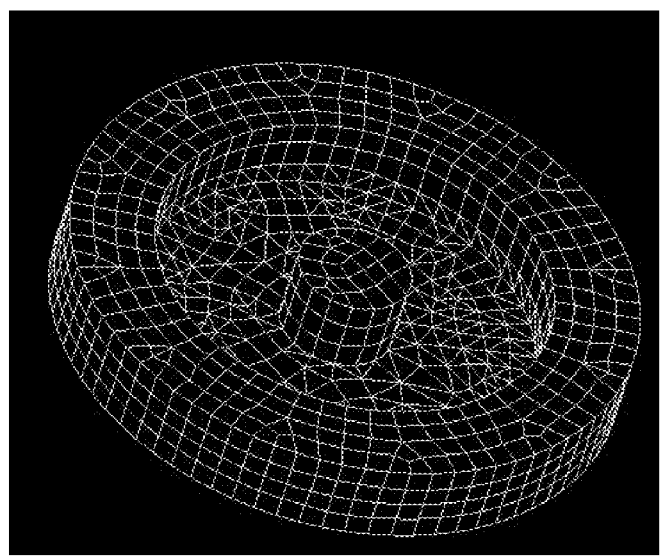
FIG. 3B shows the Finite Element mesh used for the calculation of the first two eigen frequencies.
Figure 4A:
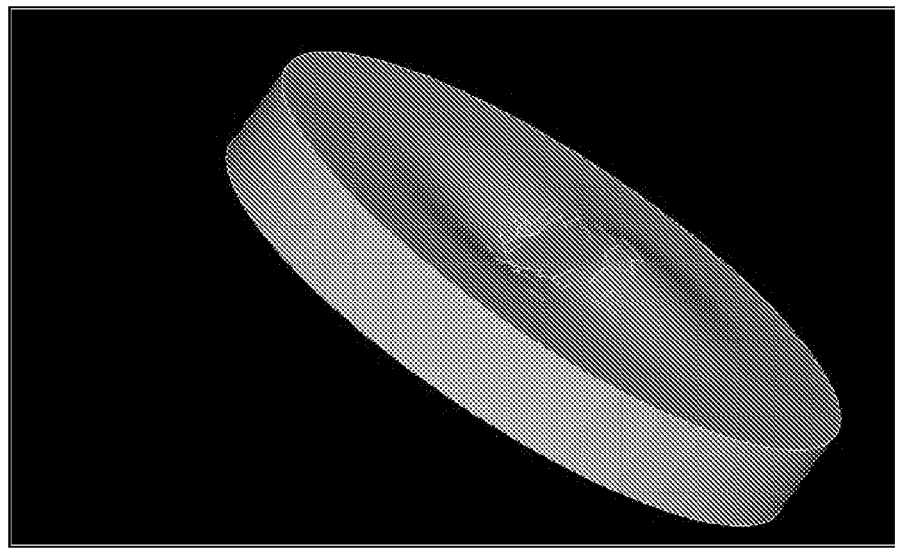
FIGS. 4A and 4B show the lowest two eigen modes of vibration corresponding the frequencies equal to each other.
Figure 4B:
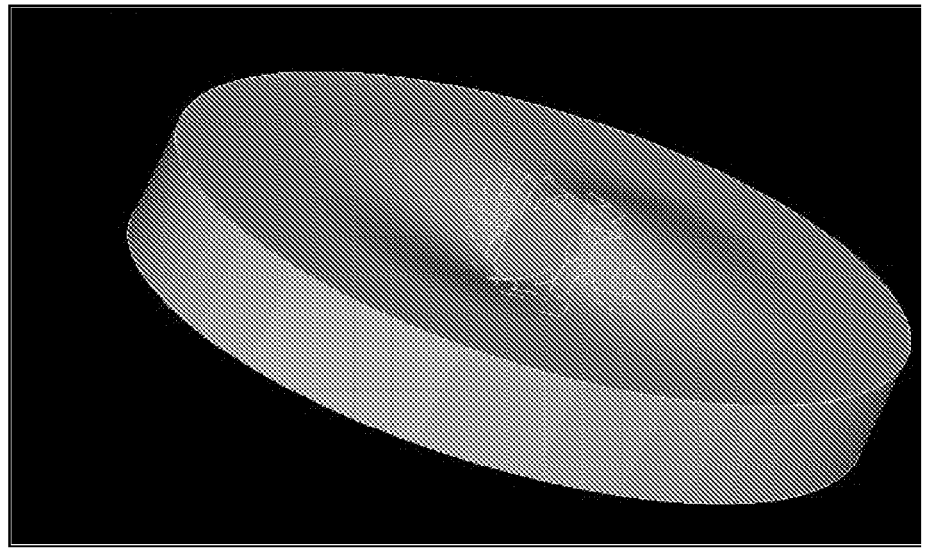

Reference is now made to FIGS. 3A-3B and FIGS. 4A-4B. FIGS. 3A and 3B show the geometry of an experimental sensor device configured as described above from an SOI wafer with the 1000 microns radius, the 300 microns thickness of the proof mass (outer part) 16, and a 30 microns thick annular plate 14 having the external and internal radii of 300 microns and 50 microns, respectively. Two natural modes of vibration of this device were used in calculations and finite element mesh. FIGS. 4A and 4B show the lowest two eigen modes of vibration. Small discrepancy in the frequencies (25.26 kHz and 25.52 kHz) is due to imperfections of the FE mesh. As can be seen, due to axisymmetry of the device, the tiling frequencies in any direction are identical. The parameters can be shown in such a way that the tilting related frequencies are the lowest frequencies of the device.

In the presence of angular rate around an axis parallel to the disk plane (e.g., around x or y axis in FIG. 2), the Coriolis force acts in the direction perpendicular to the direction of motion and precession angle is changed. The angular rate is extracted from the measurement of the angle of precession.

Figure 5:
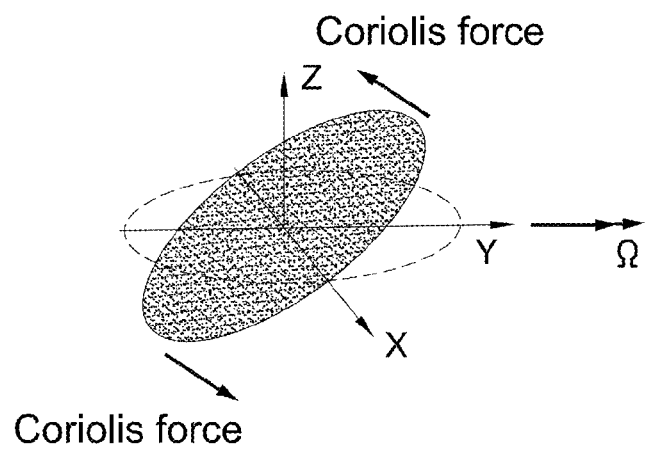
FIG. 5 describes the operational principles of the disk-shaped sensor device of the present invention.

Reference is made to FIG. 5, showing more specifically the operational principles of the disk-shaped device of the present invention, e.g. deigned as device 10 of FIG. 1. When the disk rotates around y axis (caused by rotation of an object with which the device is associated and which angular rate is to be determined), excitation of the disk for precession results in a tilting motion of the disk around x axis, its motion being in z direction. The angular rate is in y direction, Coriolis force is in x direction. Due to the Coriolis force, the precession around z axis will appear. The angular rate is extracted from the measurement of the precession direction and determination of a change in the precession phase. The change in the precession phase is caused by deformation of the annular region 14 along a circumference thereof caused by Coriolis forces (moments) induced by the disk rotation and the excited precession due to the flexing of the annular region 14 along the z- and x-axes. In this connection, it should be understood that the Coriolis force results in the bending moment acting on the plate 14 and not in an in-plane force because the center of mass of the device is located below a plane of the annular plate 14, i.e., due to the fact that the thickness $h_2$ of the annular part is larger than the thickness of the plate $h_1$. The resultant of the Coriolis force acting at the center of mass produces a moment around y-axis. This moment results in the tilting to of the device about y-axis and consequently in the change of the phase of precession. This is achievable since the plate is very compliant in bending.

Figure 6:
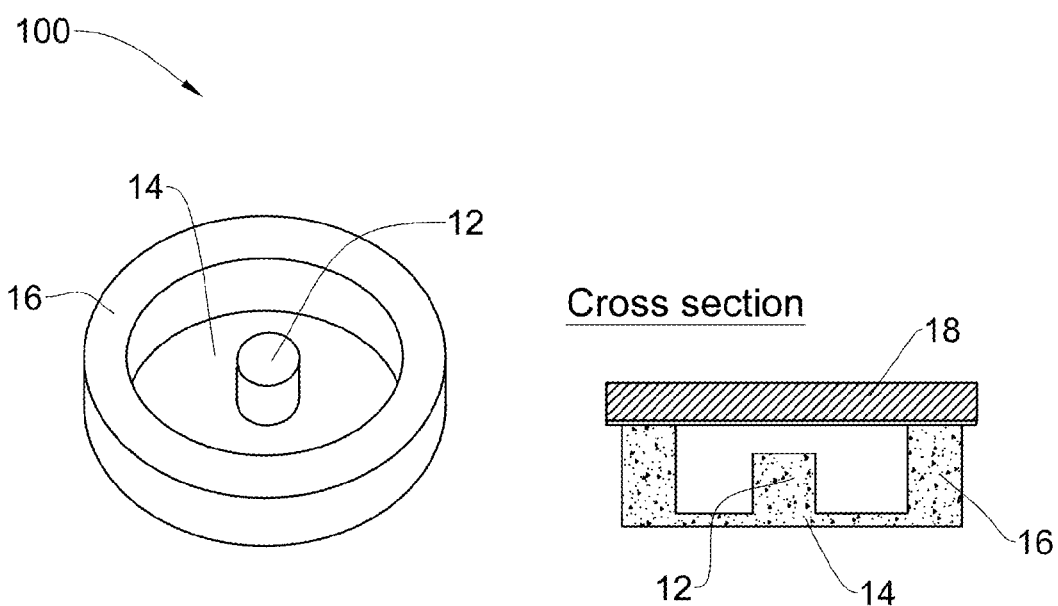
FIGS. 6 to 9 show more examples of the configuration of the device of the present invention.

Referring to FIG. 6, there is illustrated another example of a sensor device, generally designated 100, of the present invention. To facilitate understanding, the same reference numbers are used for identifying components that are common in all the examples. The device 100 is a silicon on insulator (SOI) circular wafer. The device 100 is a disk-like structure having a central relatively rigid region (stand) 12, an annular relatively flexible plate 14 of a first small thickness $h_1$, and a peripheral ring-like region 16 of a second, much larger thickness $h_2$. In the present example, in distinction to that of FIG. 1 (where the disk is attached to the substrate and coupled to the axis of device rotation by its central part 12 and thus the rigid periphery part 16 of the disk 10 serves as a proof mass), the annular plate 14 is clamped around its periphery region 16 to the substrate and coupled to the axis of rotation, while the released central stand 12 serves as a proof mass. This configuration is simpler from the fabrication point of view.

Figure 7:
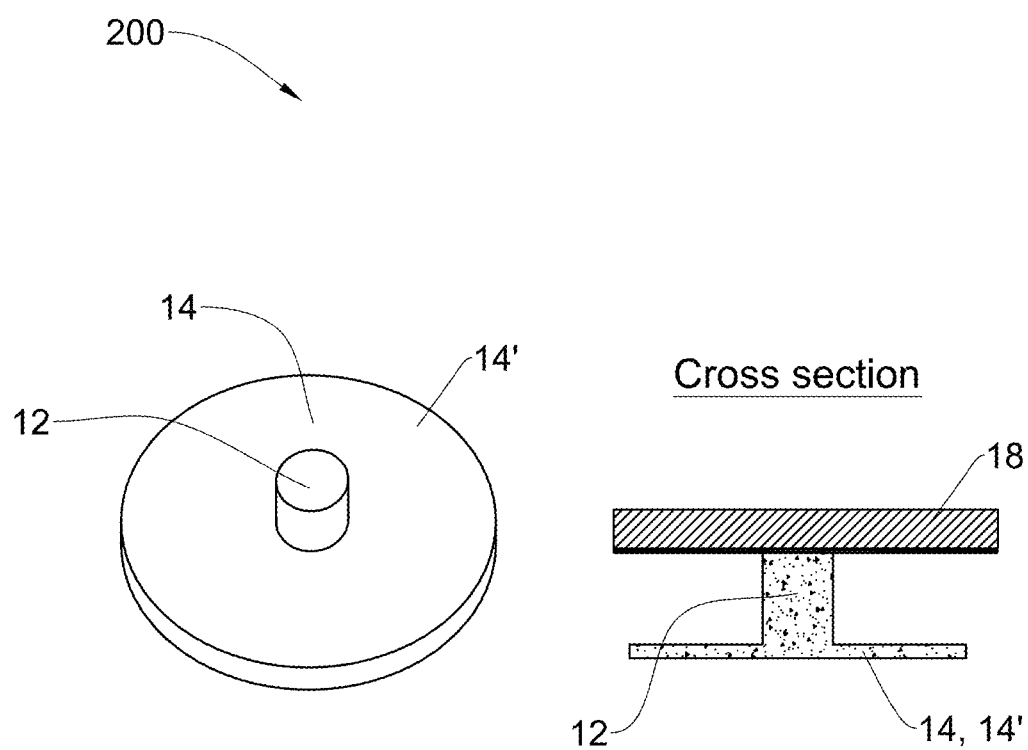

FIG. 7 illustrates yet another specific but not limiting example of the implementation of the sensor device of the present invention. Here, the device 200 includes an annular thin flexible plate 14 surrounding a central stand 12 and the latter is attached to a substrate 18 to be coupled to the axis of rotation. A peripheral part 14' of the plate 14 serves as a proof mass. In this case, higher modes of flexural vibration wave propagation along the free edge of the plate in circumferential direction can be used for the Coriolis force detection. An advantage of this configuration is that it can be fabricated using surface micromachining and integrated into standard semiconductor process.

Figure 8:
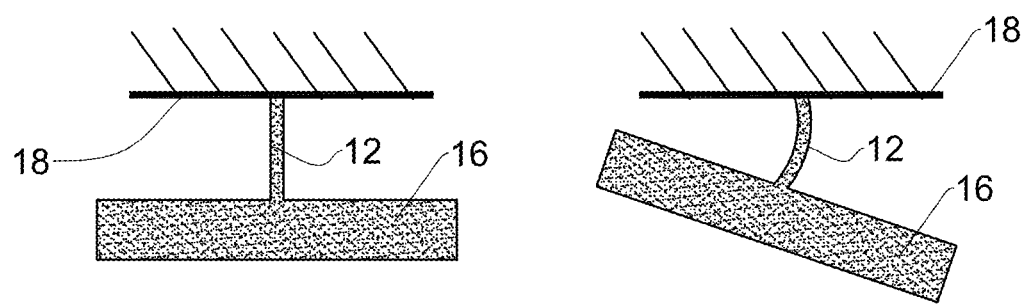

FIG. 8 illustrates yet further specific but not limiting example of the implementation of the sensor device of the present invention. The device is configured generally similar to that of FIG. 7, namely includes a disk-shaped plate of substantially the same thickness along the plate which is attached to a substrate 18 by a central stand 12. Here, the stand 12 is flexible and the disk-shaped plate 16 serves as a proof mass.

Figure 9:
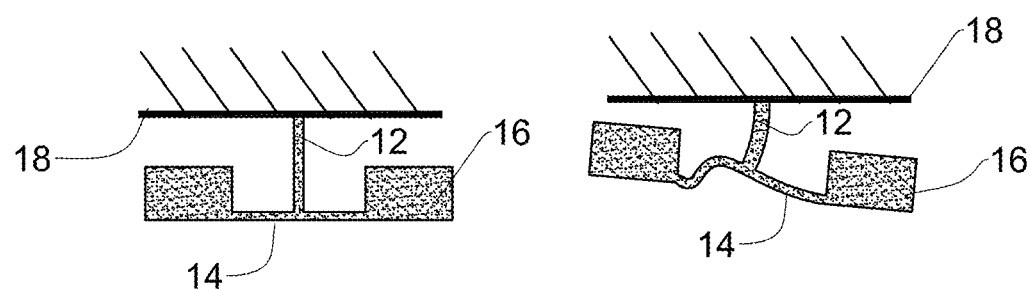

FIG. 9 illustrates yet another not limiting example of the implementation of the sensor device of the present invention. The device is configured generally similar to that described above with reference to FIG. 2, namely includes a disk-shaped plate incorporating a central flexible annular region 14 attached to a substrate 18 by a central stand 12. Annular-shaped region of the plate 16 serves as a proof mass. In this configuration, the central stand is flexible, and the compliance at the central point is provided by the combination of the central flexible region 14 compliance and the flexible stand 12 compliance.

The set of comb type electrostatic actuators and sensors can be provided at the device layer. The device can be fabricated from polymeric materials or magnetic materials. Sensing can be realized using piezoelectric or piezo-resistive elements formed within the device layer. This technology is well established in the pressure sensors industry. The device can be made not necessarily at micro scale. The macro scale device can be fabricated using conventional methods and can be a low cost replacement for expensive spinning disk gyros.

The invention claimed is:

1. An angular rate sensor for determination of an angular rate of rotation of a rotatable substrate aggregated with the angular rate sensor, the sensor having a disk-shaped structure comprising:
   a central stand region attached to the rotatable substrate at one end and extending from the rotatable substrate in a direction substantially perpendicular to an axis of rotation of the rotatable substrate;
   an annular plate region surrounding the central stand region and being attached to another end of the central stand region such that a plane of the annular plate region is substantially parallel to the axis of rotation of the rotatable substrate; and
   a periphery region surrounding the annular region and extending from the annular plate region outwards from the annular plate region in a periphery region plane being substantially parallel to the axis of rotation of the rotatable substrate.

2. The angular rate sensor of claim 1, wherein said annular plate region is a relatively flexible annular region, whereas said periphery region is a relatively rigid region as compared to the annular plate region.

3. The angular rate sensor of claim 2, wherein said relatively flexible annular region is configured to be deformable along a circumference thereof and along axes perpendicular to the axis of rotation.

4. The angular rate sensor of claim 2, wherein the flexible annular region is configured as a region of an appropriate thickness allowing the deformation and having a certain moment of inertia with respect to an axis of symmetry of the disk-shaped structure.

5. The angular rate sensor of claim 4, wherein said periphery region is much thicker than the annular plate region.

6. The angular rate sensor of claim 1 attached to the rotatable substrate by a flexible stand having a bending and torsion compliances.

7. The angular rate sensor of claim 1, fabricated by micromachining.

8. The angular rate sensor of claim 6, fabricated in a silicon-on-insulator (SOI) wafer.

9. A method of manufacturing an angular rate sensor for determination of an angular rate of rotation of a rotatable substrate aggregated with the angular rate sensor, the method comprising:
   patterning a disk-shaped structure to define (i) a central stand region configured for attaching to the rotatable substrate at one end of the central stand region; (ii) an annular plate region surrounding the central stand region and being substantially perpendicular to the central stand region; and (iii) a periphery region surrounding the annular region and extending therefrom outwards in the same plane as the annular plate region; and
   attaching the central stand region to the rotatable substrate such that the central stand region extends from the rotatable substrate in a direction substantially perpendicular to an axis of rotation of the rotatable substrate.

10. A method for determination of an angular rate of rotation of a rotatable substrate aggregated with the angular rate sensor, the method comprising:
   (a) attaching an angular rate sensor to the rotatable substrate, said angular rate sensor having a disk-shaped structure comprising:
      a central stand region configured for attaching to the rotatable substrate at one end and extending from the rotatable substrate in a direction perpendicular to an axis of rotation of the rotatable substrate;
      an annular plate region surrounding the central stand region and being attached to another end of the central stand region such that a plane of the annular plate region is parallel to the axis of rotation of the rotatable substrate; and
      a periphery region surrounding the annular region and extending from the annular plate region outwards in a periphery region plane being substantially parallel to the axis of rotation of the rotatable substrate;
   (b) exciting the disk-shaped structure rotated together with the rotatable substrate to cause a precession motion of the periphery region with tilting of at least the periphery region plane relative to the axis of rotation of the rotatable substrate;
   (c) measuring a change of the precession motion and determining a precession phase indicative of the angular rate of the disk-shaped structure rotation.

\* \* \* \* \*